Dec. 10, 1957       J. H. POWERS       2,815,569
METHOD OF CUTTING MATERIAL HAVING A FRANGIBLE COATING
Filed Sept. 17, 1952
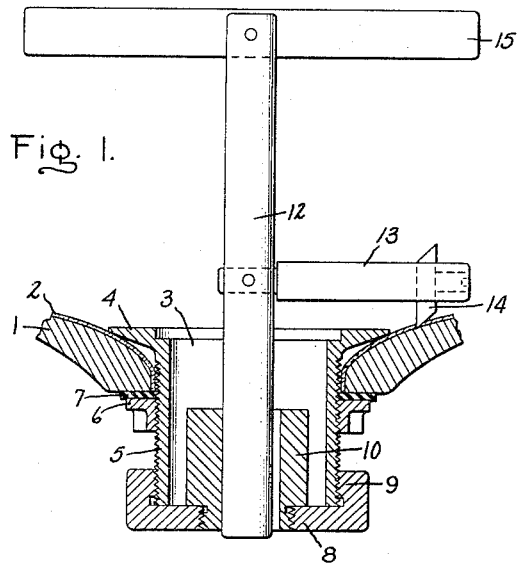
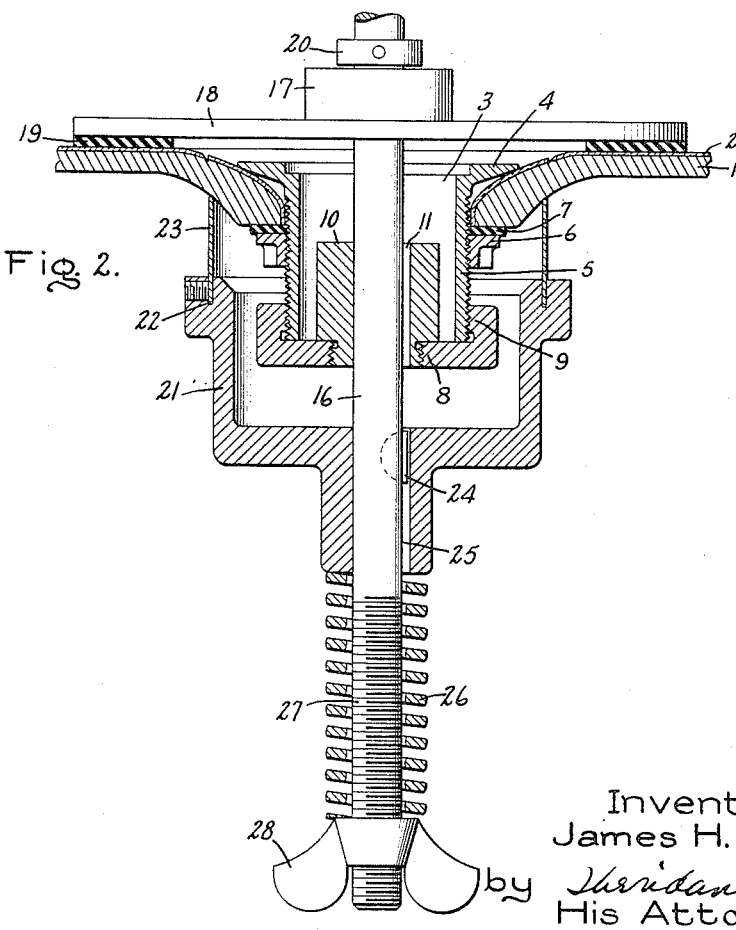
Inventor:
James H. Powers,
by  *Sheridan...*
His Attorney.

United States Patent Office 2,815,569
Patented Dec. 10, 1957

2,815,569

METHOD OF CUTTING MATERIAL HAVING A FRANGIBLE COATING

James H. Powers, Westport, Conn., assignor to General Electric Company, a corporation of New York Application September 17, 1952, Serial No. 310,001

4 Claims. (Cl. 29—545)

This invention relates to cutting methods and more particularly, to methods for cutting material having a frangible coating such as vitreous enamel coated cast iron sinks.

A principal difficulty involved in cutting materials having a frangible coating is the tendency of such coating to crack and flake off in the area adjacent the cut. One example of this difficulty has arisen in connection with the installation of waste food grinders in vitreous enamel coated kitchen sinks having a drain opening too small to accommodate the mounting flange of such devices. Before a waste food grinder can be installed in a sink of this type it is, of course, necessary to enlarge the drain opening sufficiently to accommodate a larger flange than was originally fitted in the opening. At the same time it is important that cracking and chipping of the vitreous enamel around the new opening be avoided.

Accordingly, a principal object of this invention is to provide a method for cutting material having a frangible coating whereby cracking, chipping and flaking of the frangible coating is avoided.

A further object of the invention is to provide a method for cutting a circular opening in a sheet of material having a frangible coating whereby breakage of the frangible coating is confined within the area circumscribed by the cut, thus preserving the surrounding portions of the frangible coating intact.

Another object of the invention is to provide a method for enlarging the drain opening of a sink without cracking or breaking the vitreous enamel coating on the sink wall surrounding the opening.

Further objects and advantages of my invention will become apparent as the following description proceeds and the features of novelty which characterize my invention will be pointed out with particularity in the claims annexed to and forming a part of this specification.

Briefly stated, in accordance with one aspect of my invention, I utilize a rotatable cutting device adapted to inscribe a circular V-shaped groove in the vitreous enamel coating on the sink wall around the drain opening. Thereafter a circular cut on the uncoated underside of the sink wall is made, this cut being of slightly smaller diameter than the diameter of the circular groove in the enamel coating. Thus, when the second cut is completed, only the vitreous enamel coating within the confines of the circular groove will chip or break away leaving the sink walls surrounding the enlarged opening intact.

For a better understanding of my invention, reference may be made to the accompanying drawing in which Fig. 1 is a fragmentary sectional view of a sink drain opening in which is mounted cutting apparatus which may be utilized in practicing my invention.

Fig. 2 is similar to Fig. 1, but shows the portion of the aforementioned cutting apparatus which extends below the surface of the sink wall.

Referring to the drawing, the numeral 1 designates the cast iron bottom wall of a kitchen sink having a lining or coating 2 of vitreous enamel and a drain opening 3. Fitted within drain opening 3 is a flange 4 having a downwardly extending threaded portion 5 on which a flange nut 6 may be screwed to hold the flange 4 in position. A gasket 7 positioned between bottom wall 1 and flange nut 6 is provided to insure a fluid tight connection. The structure described thus far is well known and is to be taken as representative of the type of sink drain opening which may be enlarged by the practice of my invention.

Before describing the steps of my new method in detail it is thought that a description of one form of cutting apparatus which may be utilized is desirable. As illustrated in the drawing, a hub member 8 is mounted in drain opening 3 by means of a screw-threaded flange 9 adapted to engage threaded portion 5 of flange 4. Hub member 8 includes a shaft bearing 10 suitably secured thereto, a longitudinal slot 11 forming a keyway being provided in the bore of shaft bearing 10. As shown in Fig. 1 a device for inscribing a circular V-shaped groove in the vitreous enamel coating 2 of bottom wall 1 may be rotatably supported in hub member 8. This device comprises a shaft 12 supported for rotation in shaft bearing 10, an arm 13 fixedly secured to the mid-portion of shaft 12 and a cutting bit 14 suitably mounted adjacent the free end of arm 13. It will be understood that cutting bit 14 is formed with a sharp pointed cutting edge of a sufficiently hard material, such as tungsten carbide, to cut vitreous enamel and like material and that it is removably mounted in arm 13 so as to permit removal for sharpening or replacement. Shaft 12 may be rotated in shaft bearing 10 by means of a handle 15 rigidly secured to the upper end thereof.

Referring to Fig. 2, shaft 16 may also be mounted for rotation in drain opening 3, being supported therein by shaft bearing 10 and an upper shaft bearing 17 carried by a bearing support bracket 18 adapted to rest on the bottom wall 1 of the sink. As shown in the drawing, bearing support bracket 18 may be in the form of a disk having a centrally located aperture to accommodate shaft 16 and an annular washer 17 secured to its lower surface. Annular washer 19 may be formed from hard rubber or other material suitable for providing frictional engagement between bearing support bracket 18 and bottom wall 1 without scratching or marring vitreous enamel coating 2. A collar 20 is securely fastened to shaft 16 and cooperates with a horizontal face of upper shaft bearing 17 to provide vertical support for shaft 16. Mounted on the portion of shaft 16 extending below flange 4 is a cup-shaped saw blade holder 21 having an annular groove 22 arranged to accommodate a rotary saw blade 23. A Woodruff key 24 positioned in shaft 16 cooperates with slot 25 in saw blade holder 21 to provide a driving connection between shaft 16 and saw blade holder 21 while permitting axial movement of saw blade holder 21 with respect to shaft 16. Rotary saw blade 23 is maintained in cutting engagement with bottom wall 1 by a spring 26 encircling the lower threaded portion 27 of shaft 16 between saw blade holder 21 and tension adjusting wing nut 28.

In practicing my invention for the purpose of enlarging the drain opening in a sink, cutting operations are preceded by the removal of the drain pipe normally connected to threaded portion 5 of flange 4 and the removal of any obstructions in drain opening 3. Hub member 8 may then be mounted in drain opening 3 by engaging screw-threaded flange 9 with threaded portion 5 of flange 4. After shaft 12 is inserted in shaft bearing 10 so as to support cutting bit 14 in cutting engagement with vitreous enamel coating 2, as shown in Fig. 1, a circular V-shaped groove may be made in vitreous enamel coating 2 by rotating handle 15 about the axis of shaft 12.

Groove 29 should be of a diameter slightly larger than the desired diameter of the enlarged opening and should extend entirely through the coating 2 and slightly into bottom wall 1 so as to completely sever the portions of coating 2 lying along the edges of the groove. Shaft 12 and the parts connected thereto are then removed from drain opening 3 leaving hub member 8 in place to support shaft 16 and the parts connected thereto during the next step of the cutting operation. Shaft 16 is then inserted in hub member 8 being supported by upper shaft bearing 17 and bearing support 18, rotary saw blade 23 being mounted in cutting position as shown in Fig. 2. Shaft 16, saw blade holder 21 and rotary saw blade 23 are then rotated to make a circular cut in bottom wall 1, preferably by a power driven tool (not shown) suitably connected to the upper end of shaft 16. It will be observed that upon completion of this cut, rotary saw blade 23 will emerge in the area circumscribed by V-shaped groove 29 and hence cracking and flaking of vitreous enamel coating 2 will be confined to this area.

Although I have illustrated and described my method of cutting materials having a frangible coating in connection with the enlargement of a sink drain opening by means of a particular apparatus, it will be apparent to those skilled in the art that my method may be utilized in cutting various other materials having a frangible coating and that various cutting devices may be employed other than the apparatus disclosed. The essential steps of my method include the cutting of a V-shaped groove in the frangible coating, the groove being located so as to define one area of the coated surface in which breakage of the coating must be avoided and a second area in which breakage of the coating must be confined. Then by making the final cut through the base material in a location such that both edges of the severed material lie within the second area, breakage of the coating within the first area is prevented. For example, it is obvious that this method may be used in making openings in imperforate sheets of material having a frangible coating by aligning the two cuts on opposite sides of the material as specified. Furthermore, my method may be employed to cut sheets of material having a frangible coating into strips or even irregular shapes by inscribing two parallel V-shaped grooves on the coating, each groove being equally offset from the line along which the cut through the base material is to be made. Thus, by starting the cut through the base material on the uncoated side of the material and guiding the cutting tool so that it will emerge through the coated side between the two V-shaped grooves, breakage of the coating will be confined between the two grooves and the frangible coating on the severed strips or irregular shapes will be preserved intact.

While I have shown and described a specific embodiment of my invention, I do not desire my invention to be limited to this particular embodiment, and I intend by the appended claims to cover all modifications within the true spirit and scope of my invention.

What I claim as new and desire to secure by Letters Patent of the United States is:

1. A method of cutting a circular opening in a sheet of material having a frangible coating on one side thereof, comprising the steps of first inscribing a circular groove in said frangible coating to a depth sufficient to expose said material, and thereafter making a circular cut in the uncoated side of said sheet concentric with said circular groove, but of smaller diameter than the diameter of said groove, whereby breakage of said coating upon completion of said cut is confined to the area circumscribed by said circular groove.

2. A method of enlarging a circular opening in a metal body having a vitreous enamel coating on one side thereof comprising the steps of first inscribing a circular V-shaped groove in said frangible coating to a depth sufficient to expose the underlying metal, the diameter of said circular groove being slightly greater than the diameter of the enlarged opening to be made, and thereafter making a circular cut in the uncoated side of said metal body of a diameter equal to the desired diameter of the opening, whereby the breakage of said vitreous enamel coating is limited to the area circumscribed by said circular groove.

3. A method of enlarging the drain opening of a vitreous enamel coated sink comprising the steps of first inscribing a circular V-shaped groove in the vitreous enamel coating of said sink, said groove being concentric with said drain opening and of a depth sufficient to penetrate the material underlying said coating and thereafter making a circular cut in the uncoated side of said sink concentric with said circular groove, but of slightly smaller diameter, whereby breakage of said vitreous enamel coating upon completion of said cut is confined to the area circumscribed by said circular groove.

4. A method of cutting a sheet of material having a frangible coating on one side thereof comprising the steps of first inscribing a pair of spaced apart parallel grooves in the frangible coating parallel to a line on the sheet along which the cut is to be made, said grooves being positioned on opposite sides of said line and of a depth sufficient to expose said material, and thereafter making a cut through the base material of said sheet along said line, said cut being started on the uncoated side of said sheet, whereby cracking of said coating upon completion of said cut is confined to the area between said parallel grooves.

References Cited in the file of this patent

UNITED STATES PATENTS

| | | |
|---|---|---|
| 572,320 | Stuparich | Dec. 1, 1896 |
| 1,477,570 | Lehman | Dec. 18, 1923 |
| 1,675,469 | Schreiner | July 3, 1928 |
| 1,755,210 | Dohner | Apr. 22, 1930 |
| 2,018,683 | Meyer | Oct. 29, 1935 |
| 2,230,400 | Cadirola | Feb. 4, 1941 |
| 2,289,409 | Connors | July 14, 1942 |
| 2,309,843 | Greenspan | Feb. 2, 1943 |
| 2,320,498 | Wheeler | June 1, 1943 |
| 2,333,841 | Bugge | Nov. 9, 1943 |
| 2,423,810 | Goulding | July 8, 1947 |
| 2,480,595 | Moyer | Aug. 30, 1949 |
| 2,520,259 | Pummill | Aug. 29, 1950 |
| 2,631,360 | Sanford | Mar. 17, 1953 |